(12) United States Patent
Matsukawa

(10) Patent No.: US 8,675,237 B2
(45) Date of Patent: Mar. 18, 2014

(54) IMAGE FORMING APPARATUS, IMAGE FORMING METHOD, AND COMPUTER READABLE MEDIUM FOR COMPARING TWO TYPES OF PRINT DATA

(75) Inventor: Yasuhito Matsukawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 168 days.

(21) Appl. No.: 13/365,926

(22) Filed: Feb. 3, 2012

(65) Prior Publication Data

US 2013/0070289 A1  Mar. 21, 2013

(30) Foreign Application Priority Data

Sep. 16, 2011 (JP) .................................. 2011-202780

(51) Int. Cl.
*G06F 15/00* (2006.01)
*G06F 3/12* (2006.01)
*G06K 1/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| 8,514,416 B2 * | 8/2013 | Anai .............................. 358/1.13 |
| 2003/0197749 A1 * | 10/2003 | Kawakami ........................ 347/15 |
| 2009/0244610 A1 * | 10/2009 | Mizutani et al. .............. 358/1.15 |

FOREIGN PATENT DOCUMENTS

JP    2007-148578 A    6/2007

* cited by examiner

*Primary Examiner* — Douglas Tran
(74) *Attorney, Agent, or Firm* — Sughrue Mion, PLLC

(57) ABSTRACT

An image forming apparatus includes a receiving unit, a first drawing unit, a second drawing unit, a comparing unit, and a notifying unit. The receiving unit receives image data to be printed. The first drawing unit creates print data by converting image data expressed in a first page description language into image data expressed in a second page description language in the case of checking whether or not output results obtained from different drawing schemes are different from each other. The second drawing unit creates print data directly from the image data expressed in the first page description language in the case of checking whether or not output results obtained from different drawing schemes are different from each other. The comparing unit compares, in units of pixels, two types of print data. The notifying unit performs notification of a comparison result generated by the comparing unit.

8 Claims, 5 Drawing Sheets

IMAGE FORMING APPARATUS, IMAGE FORMING METHOD, AND COMPUTER READABLE MEDIUM FOR COMPARING TWO TYPES OF PRINT DATA

CROSS-REFERENCE TO RELATED APPLICATIONS

This application is based on and claims priority under 35 USC 119 from Japanese Patent Application No. 2011-202780 filed Sep. 16, 2011.

BACKGROUND

Technical Field

The present invention relates to an image forming apparatus, an image forming method, and a computer readable medium.

SUMMARY

According to an aspect of the invention, there is provided an image forming apparatus including a receiving unit, a first drawing unit, a second drawing unit, a comparing unit, and a notifying unit. The receiving unit receives image data to be printed. The first drawing unit creates print data by converting image data expressed in a first page description language into image data expressed in a second page description language in the case of checking whether or not output results obtained from different drawing schemes are different from each other. The second drawing unit creates print data directly from the image data expressed in the first page description language in the case of checking whether or not output results obtained from different drawing schemes are different from each other. The comparing unit compares, in units of pixels, two types of print data created by the first drawing unit and the second drawing unit. The notifying unit performs notification of a comparison result generated by the comparing unit.

BRIEF DESCRIPTION OF THE DRAWINGS

Exemplary embodiment(s) of the present invention will be described in detail based on the following figures, wherein.

DETAILED DESCRIPTION

Figure 1:
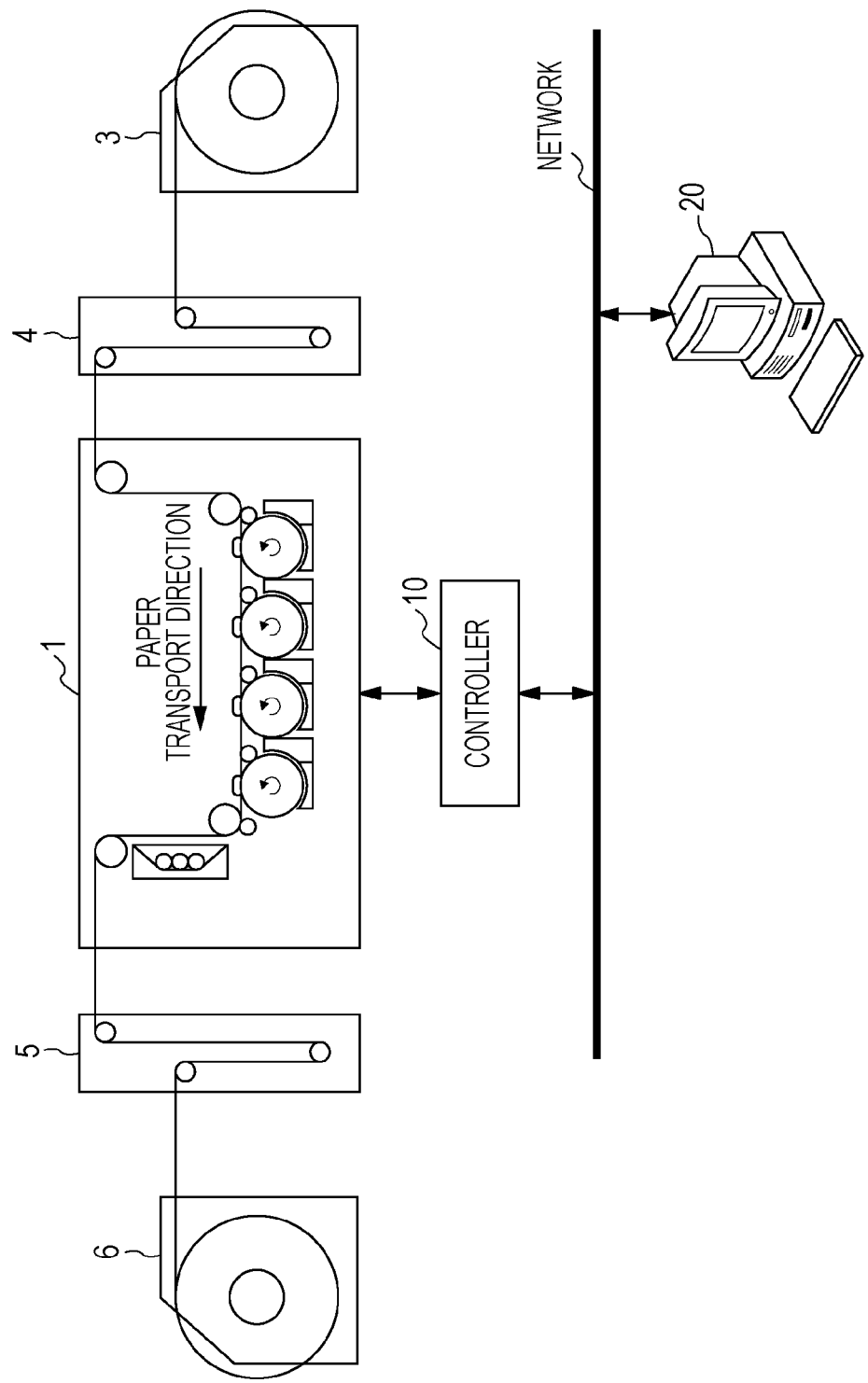
FIG. 1 is a diagram illustrating the configuration of a printing system according to an exemplary embodiment of the present invention.

In order to assist in the understanding of the present invention, the background and outline of the present invention will be described.

Hitherto, a drawing scheme using a software unit called configurable PostScript interpreter (CPSI) has been used as a drawing scheme for creating print data in bitmap format from image data in portable document format (PDF), which is widely used as a document format and a page description language (hereinafter, such image data is referred to as PDF data). In this drawing scheme using the CPSI, however, PDF data is converted once into image data expressed in a page description language called PostScript (registered trademark), such image data being referred to as PostScript data, and a drawing process is performed on the basis of the PostScript data, so as to generate print data.

In this drawing scheme using the CPSI, PDF data is converted once into PostScript data, which is an intermediate file format, and thus the processing efficiency is poor. Also, a storage region for storing PostScript data is used. Furthermore, if there is a function available for PDF but not available for PostScript, the function available for PDF is no longer available since PDF data is converted into PostScript data.

Therefore, in recent years, there has been suggested a drawing scheme using a software unit called Adobe PDF print engine (APPE), in which print data is created by performing a drawing process directly on PDF data.

The drawing scheme using the APPE enables a user to directly create print data on the basis of PDF data, and is thus becoming popular as a scheme for printing PDF data.

However, an output result obtained by processing PDF data using the CPSI and an output result obtained by processing the PDF data using the APPE may not completely match each other. Thus, if the drawing scheme for PDF data is changed from CPSI to APPE, the respective output results are different from each other although a printing process is performed using the same image data. A user may not be satisfied with such output results.

Exemplary Embodiment

Hereinafter, an exemplary embodiment of the present invention will be described in detail with reference to the drawings.

FIG. 1 is a diagram illustrating an example of the configuration of a printing system (image forming apparatus) according to an embodiment of the present invention. As illustrated in FIG. 1, the printing system includes a preprocessor 3, a buffer device 4, a printing device (image output device) 1 that performs printing on continuous paper, a buffer device 5, a postprocessor 6, a controller 10, and a terminal device 20.

The preprocessor 3 performs preprocessing, such as feeding of printing paper on which printing has not been performed. The postprocessor 6 performs postprocessing, such as rewinding of printing paper on which printing has been performed. The buffer devices 4 and 5 are provided for, for example, maintaining the tension of printing paper between the preprocessor 3 and the printing device 1 and between the printing device 1 and the postprocessor 6.

The terminal device 20 generates a print instruction, such as a print job, and transmits the print instruction to the controller 10 via a network. The controller 10 functions as a print controller that controls a printing operation of the printing device 1 in response to a print instruction transmitted from the terminal device 20. The printing device 1 outputs an image onto continuous paper in response to the print instruction on the basis of the control performed by the controller 10.

Figure 2:
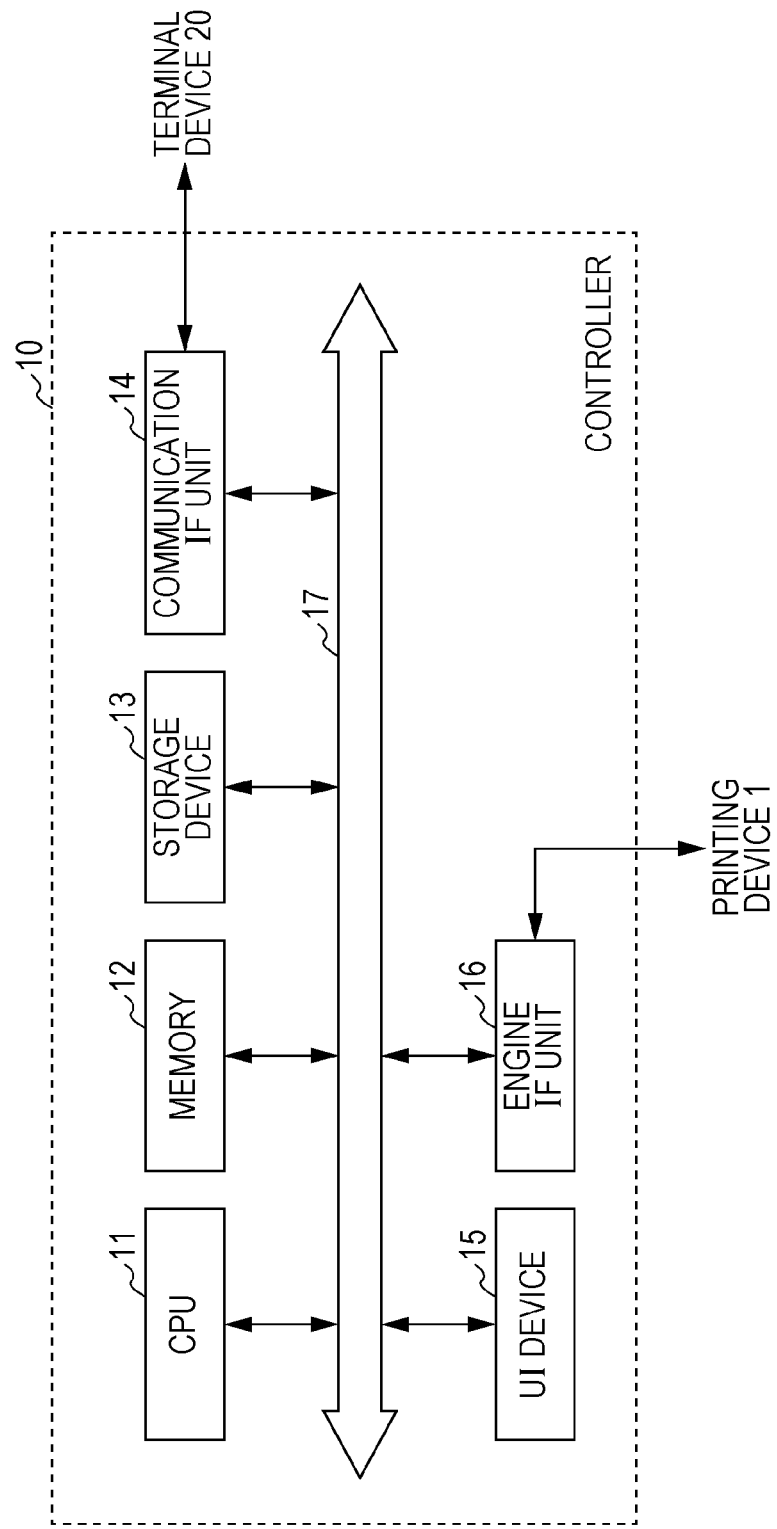
FIG. 2 is a block diagram illustrating the hardware configuration of a controller in the printing system according to an exemplary embodiment of the present invention.

Next, the hardware configuration of the controller 10 in the printing system according to the exemplary embodiment will be described with reference to FIG. 2. As illustrated in FIG. 2, the controller 10 according to the exemplary embodiment includes a central processing unit (CPU) 11, a memory 12, a storage device 13 such as a hard disk drive (HDD), a communication interface (IF) unit 24 that transmits data to and receives data from the terminal device 20 via a network, a user interface (UI) device 15 formed of a touch panel or a liquid crystal display, and an engine IF unit 16 that transmits data to and receives data from the printing device 1. These elements are connected to one another via a control bus 17.

The CPU 11 executes a certain process on the basis of a print control program stored in the memory 12 or the storage device 13, and controls the operation of the controller 10.

In the exemplary embodiment, the CPU 11 reads and executes a control program stored in the memory 12 or the storage device 13. Alternatively, the program may be provided to the CPU 11 by being stored in a portable storage medium, such as a compact disc-read only memory (CD-ROM).

Figure 3:
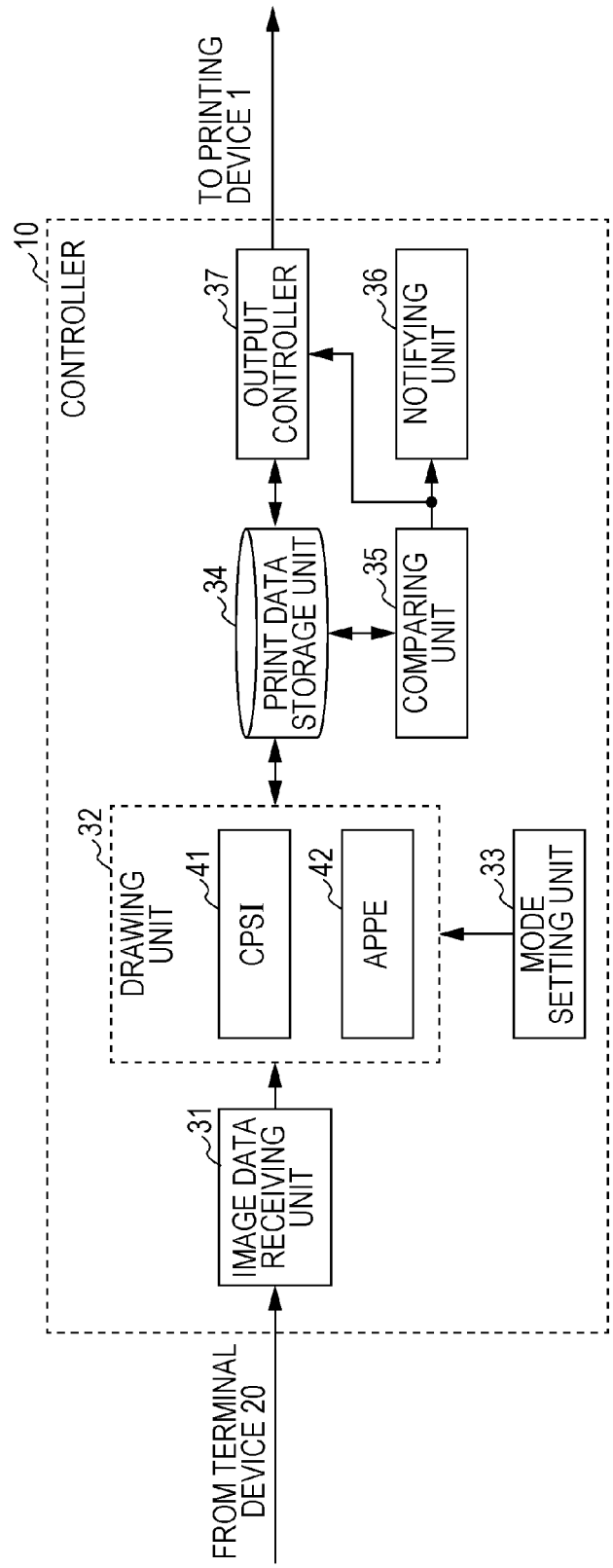
FIG. 3 is a block diagram illustrating the functional configuration of the controller in the printing system according to an exemplary embodiment of the present invention.

FIG. 3 is a block diagram illustrating the functional configuration of the controller 10. The functional configuration is realized when the control program is executed.

As illustrated in FIG. 3, the controller 10 according to the exemplary embodiment includes an image data receiving unit 31, a drawing unit 32, a mode setting unit 33, a print data storage unit 34, a comparing unit 35, a notifying unit 36, and an output controller 37.

The image data receiving unit 31 receives, as image data to be printed, image data transmitted from the terminal device 20.

The drawing unit 32 performs a drawing process on the image data received by the image data receiving unit 31, thereby converting the image data into print information on which a printing process may be performed, that is, print data in a raster format such as bitmap data (raster image data).

The drawing unit 32 is capable of selecting one of two drawing schemes based on two software units, which include a CPSI 41 and an APPE 42, when performing a drawing process on PDF data. In the drawing scheme based on the CPSI 41 (first drawing scheme), print data is created by converting image data in PDF format (first page description language) into image data in PostScript format (second page description language). In the drawing scheme based on the APPE 42 (second drawing scheme), print data is created directly from image data in PDF format.

In the printing system according to the exemplary embodiment, two modes of a print mode and a check mode may be set as operation modes. The print mode is an operation mode of executing a printing operation by performing a drawing process on print data received by the image data receiving unit 31. When the print mode is specified as an operation mode, the drawing unit 32 creates print data using a drawing scheme specified from among the drawing scheme based on the CPSI 41 and the drawing scheme based on the APPE 42 when performing a printing process on PDF data.

The check mode is an operation mode for checking, before executing printing, whether or not there is a difference between output results obtained in the two different drawing schemes, that is, the drawing scheme based on the CPSI 41 and the drawing scheme based on the APPE 42.

When the check mode is specified as an operation mode, the drawing unit 32 performs a drawing process on image data in PDF format that is received by the image data receiving unit 31, using the two drawing schemes of the drawing scheme based on the CPSI 41 (first drawing scheme) and the drawing scheme based on the APPE 42 (second drawing scheme), thereby generating two types of print data.

The mode setting unit 33 sets which of the print mode and the check mode is to be selected as an operation mode. When the print mode is set as an operation mode, the mode setting unit 33 further sets which of a drawing process based on the CPSI 41 and a drawing process based on the APPE 42 is to be performed on PDF data. Furthermore, when the check mode is set as an operation mode, the mode setting unit 33 sets which of a high level and a low level is to be used as a check level. Details of the check level will be described below.

The print data storage unit 34 stores print data which is created through a drawing process performed by the drawing unit 32. When the check mode is specified as an operation mode and when two types of print data are created using the two drawing schemes based on the two software units including the CPSI 41 and the APPE 42, the two types of print data are stored in the print data storage unit 34.

When the check mode is set as an operation mode, the comparing unit 35 compares the two types of print data generated by the drawing unit 32 in units of dots (pixels). Here, the comparing unit 35 performs either of comparison processes different from each other depending on which of the high level and low level is set as a check level by the mode setting unit 33.

When the high level is set as a check level and when all the dots of one of the two types of print data match all the dots of the other, the comparing unit 35 outputs a comparison result indicating that the two types of print data match each other. When the low level is set as a check level and when pixels compared to each other in the two types of print data have a shift of within one dot, the comparing unit 35 outputs a comparison result indicating that the two types of print data match each other.

When the check mode is specified as an operation mode, the notifying unit 36 displays a comparison result generated by the comparing unit 35 to perform notification. The notifying unit 35 may perform notification of a comparison result only when the comparing unit 35 determines that the two types of print data do not match. At that time, the notifying unit 36 may display output images of the two types of print data by superimposing them on one another, so as to notify a user of a different part.

The output controller 37 performs control to cause the printing device 1 to output an image on the basis of the print data generated by the drawing unit 32. When the check mode is specified as an operation mode and when a comparison result indicating that the two types of print data match each other is obtained in the comparing unit 35, the output controller 37 causes the printing device 1 to output an image on the basis of the print data that is drawn using the drawing scheme based on the APPE 42.

When a comparison result indicating that the two types of print data do not match is obtained in the comparing unit 35, the output controller 37 may cause the printing device 1 to output an image on the basis of the print data that is drawn using the drawing scheme based on the CPSI 41.

Next, the operation of the printing system according to the exemplary embodiment will be described in detail with reference to the drawings.

Figure 4:
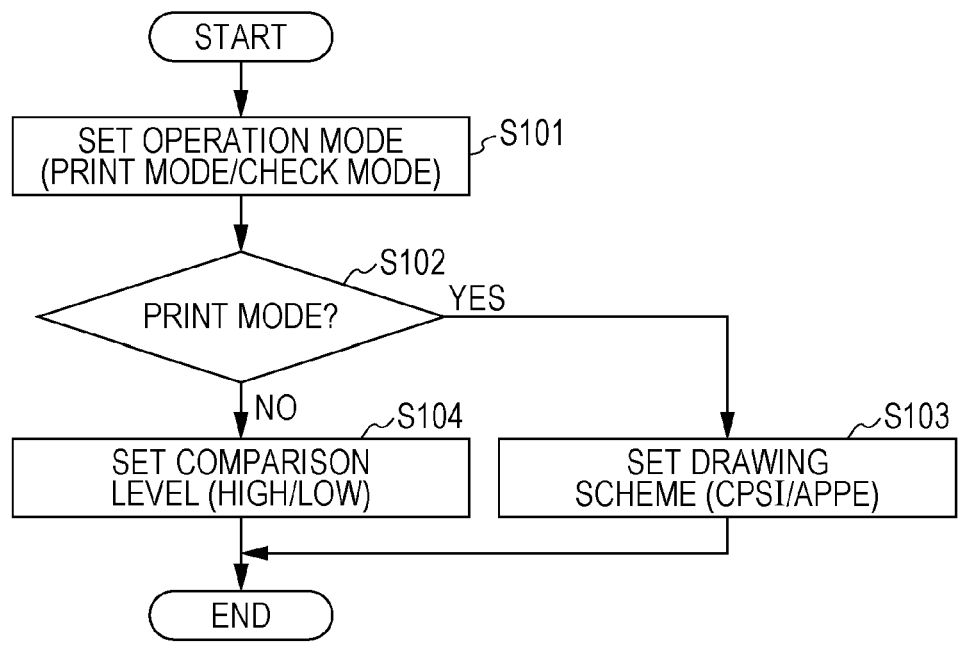
FIG. 4 is a flowchart illustrating the operation of setting an operation mode in the printing system according to an exemplary embodiment of the present invention.

First, an operation of setting an operation mode via the mode setting unit 33 before performing a printing operation will be described with reference to the flowchart in FIG. 4.

First, the mode setting unit 33 sets which of the print mode and the check mode is to be selected as an operation mode (step S101).

When the print mode is set as an operation mode in step S101 (YES in step S102), the mode setting unit 33 sets which of the drawing scheme based on the CPSI 41 and the drawing scheme based on the APPE 42 is to be selected as a drawing scheme (step S103).

When the check mode is set as an operation mode in step S101 (NO in step S102), the mode setting unit 33 sets which of the high level and low level is to be selected as a comparison level (step S104).

Figure 5:
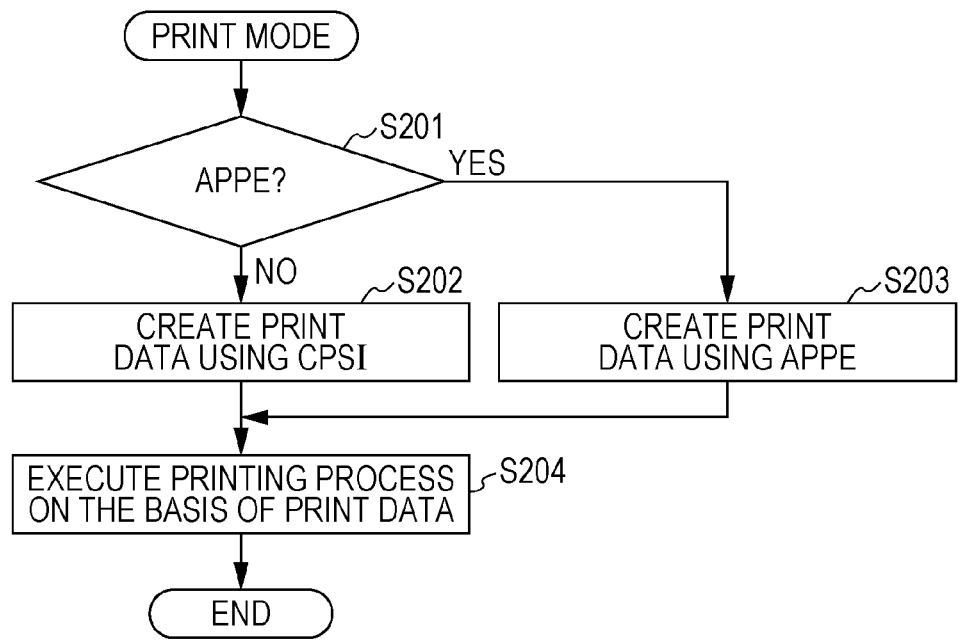
FIG. 5 is a flowchart illustrating the operation in a print mode in the printing system according to an exemplary embodiment of the present invention.

Next, operation that is performed when the print mode is set as an operation mode in the printing system according to the exemplary embodiment will be described with reference to the flowchart in FIG. 5.

In this case, the drawing unit 32 determines whether the drawing scheme based on the CPSI 41 is specified as a drawing scheme or the drawing scheme based on the APPE 42 is specified as a drawing scheme (step S201).

When it is determined in step S201 that the drawing scheme based on the CPSI 41 is specified, the drawing unit 32 performs a drawing process using the CPSI 41 on the PDF data received by the image data receiving unit 31, thereby creating print data (step S202).

When it is determined in step S201 that the drawing scheme based on the APPE 42 is specified, the drawing processor 32 performs a drawing process using the APPE 42 on the PDF data received by the image data receiving unit 31, thereby creating print data (step S203).

The print data created by the drawing unit 32 is stored in the print data storage unit 34. The output controller 37 executes a printing process by controlling the printing device 1 so that an image based on the created print data is output (step S204).

Figure 6:
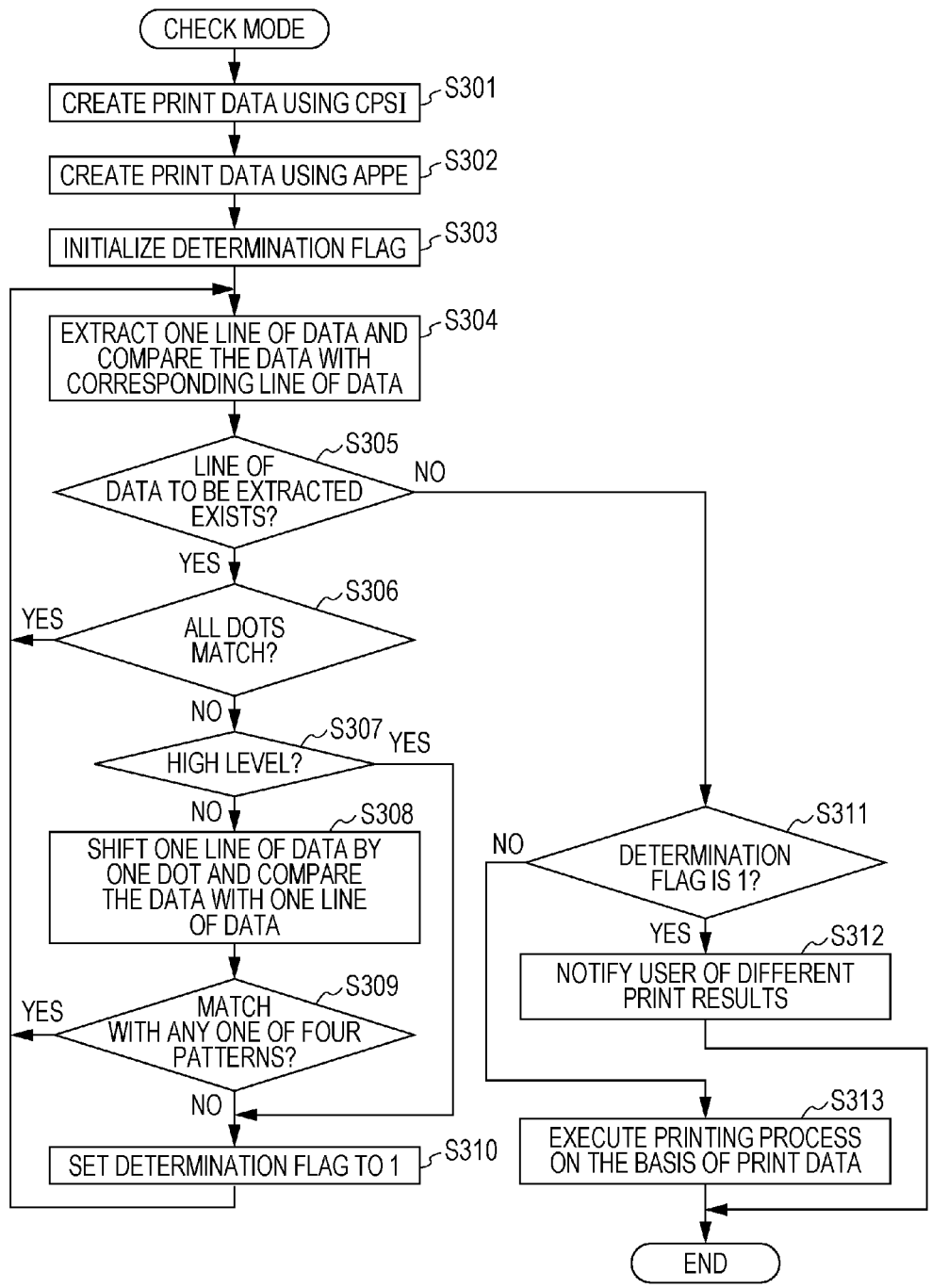
FIG. 6 is a flowchart illustrating the operation in a check mode in the printing system according to an exemplary embodiment of the present invention.

Finally, operation that is performed when the check mode is set as an operation mode in the printing system according to the exemplary embodiment will be described with reference to the flowchart in FIG. 6.

When the check mode is set as an operation mode, the drawing unit 32 creates print data by performing a drawing process using the CPSI 41 on the PDF data received by the image data receiving unit 31, and also creates print data by performing a drawing process using the APPE 42 (steps S301 and S302). Then, a determination flag is initialized to zero (step S303). The determination flag is set to one when output results obtained through the two drawing schemes are different from each other, and is set to zero when output results obtained through the two drawing schemes are the same.

The two types of print data created by the drawing unit 32 are stored in the print data storage unit 34.

Subsequently, the comparing 35 extracts one line of data from the print data created using the APPE 42, and compares the extracted one line of data with the corresponding line of data in the print data created using the CPSI 41 (step S304).

When a line of data to be extracted exists (YES in step S305) and when all the dots of data match all the dots of data as a comparison target (YES in step S306), the comparing unit 35 sequentially compares the print data created using the APPE 42 with the print data created using the CPSI 41 in units of lines.

When all the dots do not match in the comparison between pieces of data in a certain line in step S306, the comparing unit 35 determines whether or not the comparison level is set to the high level (step S307). When the comparison level is set to the high level, the comparing unit 35 sets the determination flag to one (step S310).

When it is determined in step S307 that the comparison level is set to the low level, the comparing unit 35 shifts one line of data to be compared in the print data created using the CPSI 41 by one dot upward, downward, to the right, and to the left, and compares each of four patterns of data obtained thereby with one line of data in the print data created using the APPE 42 (step S308).

When the one line of data in the print data created using the APPE 42 matches any one of the four patterns of data (YES in step S309), the comparing unit 35 determines that the difference is within an allowance, and performs comparison on the next line.

When the one line of data in the print data created using the APPE 42 does not match any of the four patterns of data (NO in step S309), the comparing unit 35 sets the determination flag to one (step S310).

When there is no more line of data to be extracted from the print data created using the APPE 42 (NO in step S305), the comparing unit 35 determines whether or not the determination flag is set to one (step S311).

When the determination flag is set to one (YES in step S311), the comparing unit 35 outputs, to the output controller 37 and the notifying unit 36, a comparison result indicating that the print data created using the CPSI 41 does not match the print data created using the APPE 42.

Accordingly, the notifying unit 36 notifies a user that the print data created using the CPSI 41 and the print data created using the APPE 42 generate print results different from each other, and displays a different part between the two print results (step S312).

When the determination flag is not set to one (NO in step S311), the output controller 37 causes the printing device 1 to output an image on the basis of the print data created using the APPE 42 (step S313).

Modification

In the above-described exemplary embodiment, description has been given of a case where pieces of print data are created using different software units, that is, CPSI and APPE. The embodiment of present invention is not limited thereto, and may be applied to the case of drawing image data expressed in another page description language using different drawing schemes.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a receiving unit that receives image data to be printed;
   a first drawing unit that creates print data by converting image data expressed in a first page description language into image data expressed in a second page description language in the case of checking whether or not output results obtained from different drawing schemes are different from each other;
   a second drawing unit that creates print data directly from the image data expressed in the first page description language in the case of checking whether or not output results obtained from different drawing schemes are different from each other;
   a comparing unit that compares, in units of pixels, two types of print data created by the first drawing unit and the second drawing unit; and
   a notifying unit that performs notification of a comparison result generated by the comparing unit.

2. The image forming apparatus according to claim 1, further comprising:

an output controller that causes an image output device to output an image on the basis of the print data crated by the second drawing unit, wherein, when a comparison result indicating that the two types of print data match is obtained from the comparing unit, the output controller causes the image output device to output an image on the basis of print data on which a drawing process has been performed by the second drawing unit.

3. The image forming apparatus according to claim 1, further comprising:

an output controller that causes an image output device to output an image on the basis of the print data crated by the first drawing unit, wherein, when a comparison result indicating that the two types of print data do not match is obtained from the comparing unit, the output controller causes the image output device to output an image on the basis of print data on which a drawing process has been performed by the first drawing unit.

4. The image forming apparatus according to claim 1, wherein, when all pixels of one of the two types of print data match all pixels of the other of the two types of print data, the comparing unit outputs a comparison result indicating that the two types of print data match.

5. The image forming apparatus according to claim 1, wherein, when pixels compared to each other in the two types of print data have a shift of within one pixel, the comparing unit outputs a comparison result indicating that the two types of print data match.

6. The image forming apparatus according to claim 1, wherein the image data expressed in the first page description language is portable document format data, and the image data expressed in the second page description language is PostScript data.

7. An image forming method comprising:

receiving image data to be printed;

creating print data by converting image data expressed in a first page description language into image data expressed in a second page description language in the case of checking whether or not output results obtained from different drawing schemes are different from each other;

creating print data directly from the image data expressed in the first page description language in the case of checking whether or not output results obtained from different drawing schemes are different from each other;

comparing, in units of pixels, two types of created print data; and performing notification of a comparison result of the two types of created print data.

8. A non-transitory computer readable medium storing a program causing a computer to execute a process, the process comprising:

receiving image data to be printed;

creating print data by converting image data expressed in a first page description language into image data expressed in a second page description language in the case of checking whether or not output results obtained from different drawing schemes are different from each other;

creating print data directly from the image data expressed in the first page description language in the case of checking whether or not output results obtained from different drawing schemes are different from each other;

comparing, in units of pixels, two types of created print data; and performing notification of a comparison result of the two types of created print data.

* * * * *